United States Patent
Lu et al.

(10) Patent No.: US 11,177,901 B1
(45) Date of Patent: Nov. 16, 2021

(54) METHOD OF WAVELENGTH-DIVISION-MULTIPLEXING-AWARE CLUSTERING FOR ON-CHIP OPTICAL ROUTING

(71) Applicant: AnaGlobe Technology, Inc., Hsinchu (TW)

(72) Inventors: Yu-Sheng Lu, New Taipei (TW); Sheng-Jung Yu, Taipei (TW); Yao-Wen Chang, Taipei (TW); Chih-Che Lin, Hsinchu (TW); Yu-Tsang Hsieh, Hsinchu County (TW)

(73) Assignee: ANAGLOBE TECHNOLOGY, INC., Hsinchu (TW)

( * ) Notice: Subject to any disclaimer, the term of this patent is extended or adjusted under 35 U.S.C. 154(b) by 0 days.

(21) Appl. No.: 17/074,126

(22) Filed: Oct. 19, 2020

(51) Int. Cl.
  *H04J 14/02* (2006.01)
  *G02F 1/313* (2006.01)
  *H04B 10/80* (2013.01)

(52) U.S. Cl.
  CPC .......... *H04J 14/0267* (2013.01); *G02F 1/313* (2013.01); *H04B 10/801* (2013.01)

(58) Field of Classification Search
  None
  See application file for complete search history.

(56) References Cited

U.S. PATENT DOCUMENTS

| | | | | |
|---|---|---|---|---|
| 8,750,161 B1* | 6/2014 | Matthews | ............. | H04W 40/02 370/254 |
| 2006/0067235 A1* | 3/2006 | Acharya | ................ | H04L 45/12 370/238 |
| 2006/0146733 A1* | 7/2006 | Alicherry | ................ | H04L 45/28 370/255 |
| 2007/0050485 A1* | 3/2007 | Zolfaghari | ............. | H04L 45/04 709/220 |
| 2009/0296719 A1* | 12/2009 | Maier | .................. | H04L 45/123 370/400 |
| 2011/0205898 A1* | 8/2011 | Ichiki | .................... | H04L 45/127 370/235 |
| 2013/0094397 A1* | 4/2013 | Kim | ........................ | H04L 45/64 370/254 |
| 2014/0192677 A1* | 7/2014 | Chew | ..................... | H04L 45/48 370/254 |

OTHER PUBLICATIONS

Lu et al., A Probably Good Wavelength-Division-Multiplexing-Aware Clustering Algorithm for On-Chip Optical Routing, Jul. 2020, IEEE (Year: 2020).*

(Continued)

*Primary Examiner* — Jai M Lee
(74) *Attorney, Agent, or Firm* — Muncy, Geissler, Olds & Lowe, P.C.

(57) ABSTRACT

A method of WDM-aware optical routing for on-chip devices is proposed, which is executed by a computer, the method comprising using the computer to perform the following steps of: performing a path separation to identify signal net candidates; performing a path clustering to find path clusters of the signal net candidates; performing an endpoint placement to find legal locations for WDM endpoints; and performing a pin-to-waveguide routing all nets to corresponding WDM waveguides.

20 Claims, 7 Drawing Sheets

(56) References Cited

OTHER PUBLICATIONS

Yu-Sheng Lu et al., "A Provably Good Wavelength-Division-Multiplexing-Aware Clustering Algorithm for On-Chip Optical Routing." 2020 57th ACM/IEEE Design Automation Conference (DAC), San Francisco, CA, USA, 2020, pp. 1-6, doi: 10.1109/DAC18072.2020.9218637.

Yu-Sheng Lu et al., PowerPoint Presentation entitled "A Provably Good Wavelength-Division-Multiplexing-Aware Clustering Algorithm for On-Chip Optical Routing," Presented Jul. 24, 2020, 36 pages (with conference program attached).

\* cited by examiner

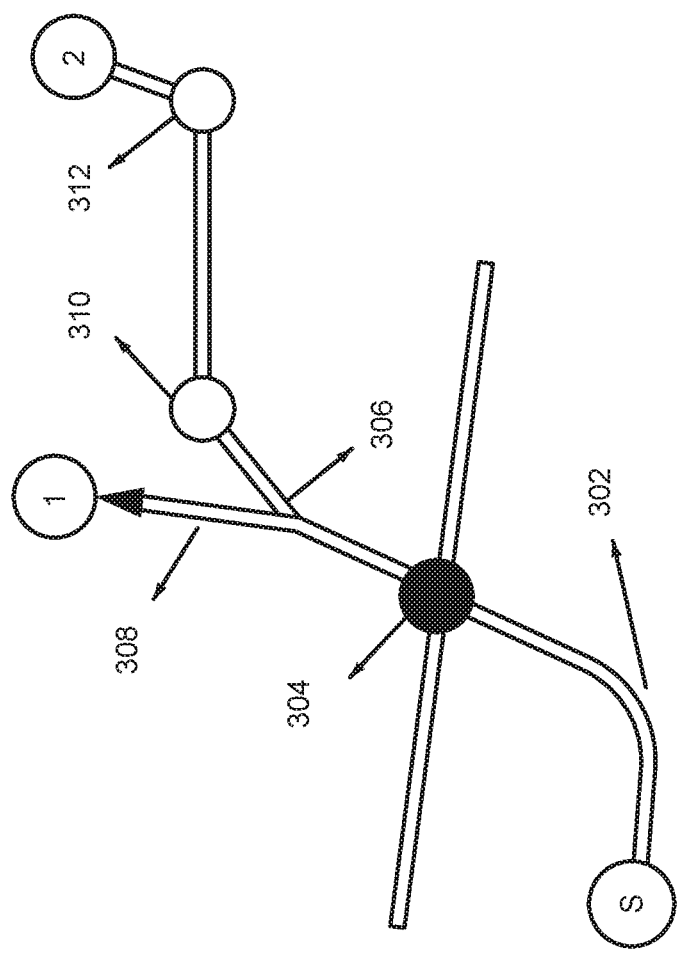

METHOD OF WAVELENGTH-DIVISION-MULTIPLEXING-AWARE CLUSTERING FOR ON-CHIP OPTICAL ROUTING

TECHNICAL FIELD

The present invention relates to an on-chip optical routing technique, and more particularly, to a method of a wavelength-division-multiplexing-aware clustering for on-chip optical routing.

BACKGROUND

With the Very-Large-Scale Integration (VLSI) process technology scaling into the deep nanometer era and the increasing demands for large bandwidth and low-power transmission, the performance of interconnections becomes a key bottleneck in modern circuit designs. As a result, electrical wires might not meet the design requirements, and thus various techniques have been proposed to resolve the problems (for example: C. Sun, et al., "Single-chip microprocessor that communicates directly using light," *Nature*, 2015). Among these techniques, optical communication based on nanophotonic devices and interconnections attracts much attention, due to its large bandwidth, low interconnection delay, and low-power consumption. For example, one of the main goals in the US DARPA-launched Electronic Resurgence Initiative (ERI) project is to bring photonic signaling to digital microelectronics. Semiconductor giants like Intel and TSMC are also actively exploring the technologies for integrating optical interconnections.

However, the layout synthesis for optical interconnections, called the optical routing problem, is quite different from the traditional electrical one. During optical routing, not only wirelength but also transmission loss needs to be minimized. Therefore, new optimization strategies are required for the optical routing problem.

Among many recent advanced techniques for the optical routing problem, Wavelength Division Multiplexing (WDM) shows a great potential of providing higher bandwidth with reasonable overheads.

As the VLSI technology continues to scale down, combined with increasing demands for large bandwidth and low-power consumption, the optical interconnections with Wavelength Division Multiplexing (WDM) become an attractive alternative for on-chip signal transmission. Previous WDM optical routing works consist of two main drawbacks: they are based mainly on heuristics or restricted integer linear programming to handle optical routing, and the addressed types of transmission loss and WDM overheads are incomplete. As a result, no performance guarantees can be achieved on their WDM clustering results, and/or their computations are too time-consuming.

The aforementioned previous works have some drawbacks. To remedy these drawbacks, the invention proposes a new approach to resolve the above-mentioned problems.

SUMMARY OF THE INVENTION

The invention proposes a provably good WDM-aware path clustering algorithm and a novel WDM-aware optical routing flow. With the performance-bounded path clustering algorithm, a good path clustering result in polynomial runtime can be found. And the proposed flow can determine the optimal locations for WDM waveguides that minimize the total wirelength, transmission loss, and wavelength power. Experimental results have shown that the proposed algorithm is superior to existing optical routing works in both solution quality and runtime.

According to one aspect, a method of WDM-aware optical routing for on-chip devices which is executed by a computer, the method comprising using the computer to perform the following steps of: performing a path separation to identify signal net candidates; performing a path clustering to find path clusters of the signal net candidates; performing an endpoint placement to find legal locations for WDM endpoints; and performing a pin-to-waveguide routing all nets to corresponding WDM waveguides.

According to one aspect, the method further comprises selecting target pins with source-to-target distances longer than a threshold distance as the signal net candidates; generating path vectors, each of the path vectors composed of a starting point and an end point from a candidate's source and the target pins.

According to another aspect, the method further comprises constructing a path vector graph including a set of nodes, wherein each node of the set of nodes includes path vectors that form a path cluster; a path vector clustering by choosing an edge with a largest gain that satisfies a capacity constraint after merging adjacent nodes connected by the edge, and removing the edge to create new edges for newly merged nodes.

According to yet another aspect, the method further comprising using results of said path clustering to determine endpoints of WDM waveguides by a gradient-search method; a process of legalizing the results of the path clustering by moving the endpoints to nearest legal positions.

According to one aspect, the method further comprises routing all nets by A* search to minimize a total wirelength and transmission loss; adjusting routing grid sizes to satisfy minimum and maximum bending radius constraints and path search directions larger than 60 degree to prevent large bending loss during the pin-to-waveguide routing; and wherein signal paths are routed from source pins to routed pins, from the source pins to said WDM waveguides, and from the WDM waveguides to target pins during the pin-to-waveguide routing.

In the invention, a non-transitory computer-readable medium containing instructions is proposed, which when read and executed by a computer, cause the computer to execute a method of WDM-aware optical routing for on-chip devices, wherein the method comprises the above-mentioned steps

BRIEF DESCRIPTION OF THE DRAWINGS

The components, characteristics and advantages of the present invention may be understood by the detailed descriptions of the preferred embodiments outlined in the specification and the drawings attached:

FIG. 3 shows five major types of transmission loss in optical routing;

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

To remedy the disadvantages of prior arts, a polynomial-time provably good WDM-aware clustering algorithm and a new WDM-aware optical routing flow are proposed to minimize the transmission loss and the WDM overheads with a significant speedup. The proposed WDM-aware clustering algorithm guarantees to find an optimal solution for 1-, 2-, and 3-path clustering, and has the constant performance bound 3 for most cases of 4-path clustering. Experimental results based on the ISPD 2007 and 2019 contest benchmarks and a real optical design show that the present invention's optical router significantly outperforms published works in wirelength, transmission loss, wavelength power, and runtimes.

The compact design of consumer electronic devices requires more and more functionalities to be packed into one integrated circuit chip, also referred to as system-on-chip (SoC). In response to this requirements, new semiconductor processing technologies have made it feasible to place millions of logic gates on a single integrated circuit. With such processing technologies, functional blocks such as the central processing unit (CPU), memory, graphic applications, communication modules, and other specialized functions may be integrated onto the SoC.

Optical interconnections are among promising solutions for on-chip communication to meet the demands for large bandwidths, efficient power consumption and good latency performance. The technique of wavelength division multiplexing is to use a shared WDM waveguide to transmit multiple signal nets in different wavelengths. This can provide higher bandwidth with reasonable overheads, reduce potential crosses, and save more routing resource.

Figure 1:
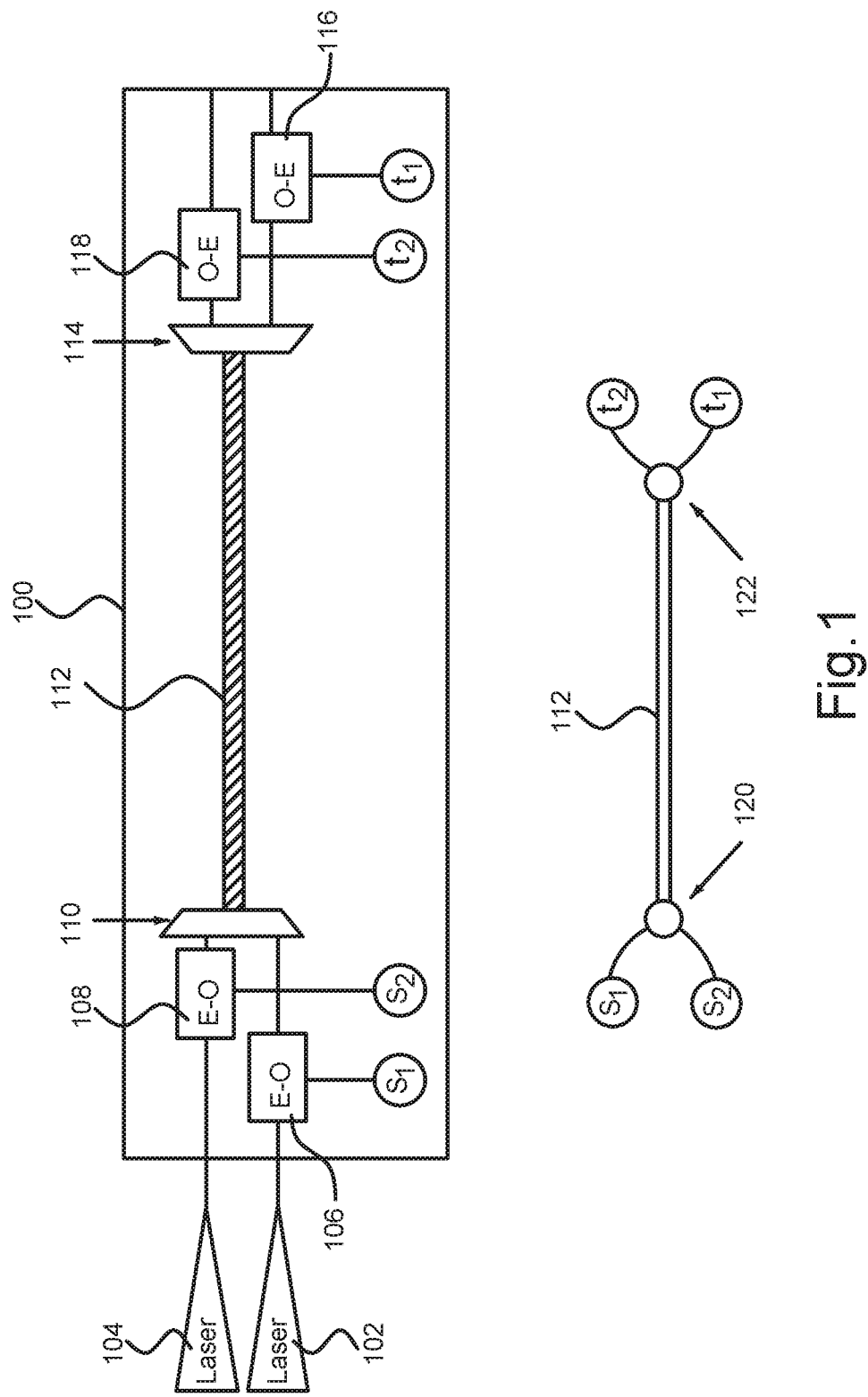
FIG. 1 shows an on-chip communication module (system) including the structure and the representation of a Wavelength Division Multiplexing (WDM) waveguide.

FIG. 1 shows an on-chip communication module (system) including the structure and the representation of a Wavelength Division Multiplexing (WDM) waveguide. By using multiplexers and demultiplexers, signal nets with different wavelengths can be clustered into a single WDM waveguide for signal transmission, saving more routing resources and reducing potential crosses. As shown in FIG. 1, an on-chip communication module includes a light source 102, 104, a transmitter 106, 108, a multiplexer 110, a waveguide 112, a demultiplexer 114 and a receiver 116, 118. For example, the transmitter 106, 108 is a first photoelectric conversion module including an optical modulator and a driver, and the receiver 116, 118 is a second photoelectric conversion module including a photo detector and an amplifier. The light source 102 is a laser capable of emitting a first wavelength ($\lambda_1$) light, and light source 102 is a laser capable of emitting a second wavelength ($\lambda_2$) light. The light source 102 is coupled to the transmitter 106, and the light source 104 is coupled to the transmitter 108. A first input/source terminal ($s_1$) is coupled to the transmitter 106, and a second input/source terminal ($s_2$) is coupled to the transmitter 108. The first input/source terminal ($s_1$), the second input/source terminal ($s_2$) may be an integrated circuit (IC) device for various applications. Therefore, signal nets with different wavelengths can be clustered into a single WDM waveguide 112 for signal transmission after multiplexing by the multiplexer 110. That is, multiple signals can be transmitted on a shared waveguide 112. After demultiplexing by the demultiplexer 114, a first signal emitted by the first source terminal ($s_1$) is received by the receiver 116 and then transmitting to the first output/target terminal ($t_1$), and a second signal emitted by the second source terminal ($s_2$) is received by the receiver 118 and then transmitting to the second output/target terminal ($t_2$). The first source terminal ($s_1$) and the second source terminal ($s_2$) are communicated with the first target terminal ($t_1$) and the second target terminal ($t_2$) between WDM endpoints 120 and 122. The WDM endpoints 120 and 122 represent the start/end points of the WDM waveguide 112.

Figure 2C:
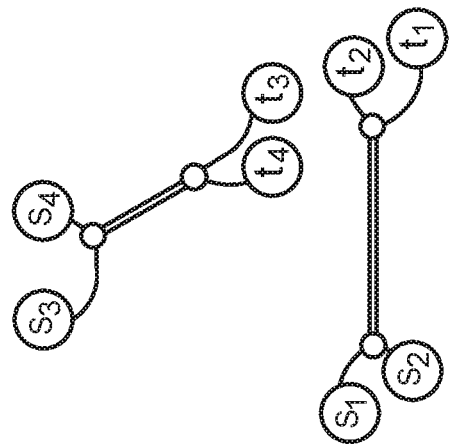
FIG. 2c illustrates an optical routing using a WDM-aware clustering algorithm.
Figure 2B:
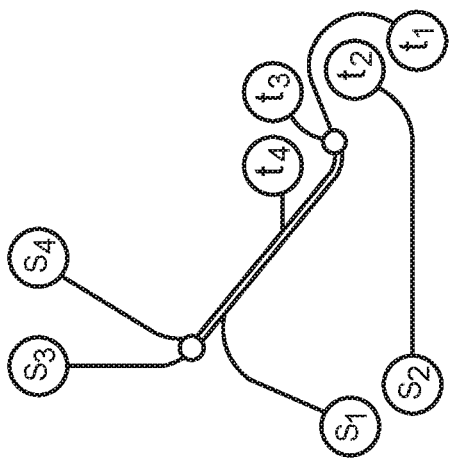
FIG. 2b illustrates an optical routing using a WDM waveguide.
Figure 2A:
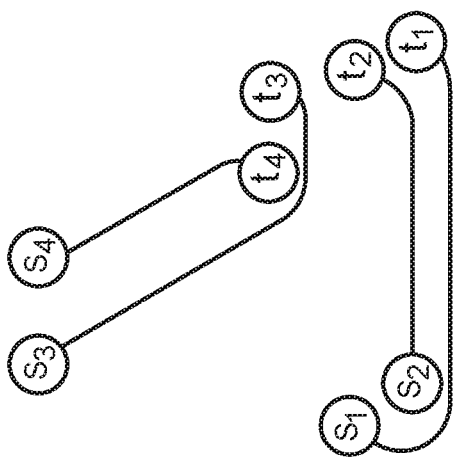
FIG. 2a illustrates an optical routing without using any WDM waveguide.

The use of WDM waveguides in optical transmission needs to be considered carefully. For example, the optical routing between the four source terminals ($s_1 \sim s_4$) and the four target terminals ($t_1 \sim t_4$) is performed without using any WDM waveguide, and therefore electrical signal crossing and wire detouring could occur, as shown in FIG. 2a. It needs to tradeoff between signal crossing and wire detouring. As the WDM signal nets are clustered poorly which a single waveguide is provided for signal transmission between the three source terminals ($s_1$, $s_3$, $s_4$) and the three target terminals ($t_1$, $t_3$, $t_4$), however, the total wirelength might be even worse, as shown in FIG. 2b. Furthermore, using WDM waveguide for signal transmission also requires additional power overheads, including drop loss and laser wavelength power, which will be detailed in the followings.

Thus, novel routing strategies for optical connections are required which optimize crossings and support different wire directions. Besides, it needs to carefully determine the clustering of signals to use WDM. Clustering and WDM waveguide placement significantly affect routing performance. In this invention, a provably good WDM clustering algorithm is proposed that can generate a desired clustering solution considering wirelength, transmission loss, and wavelength power, as shown in FIG. 2c.

Preliminaries

Firstly, the types of transmission loss and WDM induced overheads in optical routing addressed in this work, and then give our formulation of the WDM-aware optical routing problem are introduced.

An RDL layout (chips and bumps) and a set of pre-assignment nets are input.

(A) Transmission Loss and WDM Overheads

Here, five major types of transmission loss in optical routing and WDM overheads are introduced: crossing loss, bending loss, splitting loss, path loss, and drop loss as shown in FIG. 3. The crossing loss ($L_{cross}$) 304 is induced by two wires intersecting with each other. Based on the crossing angle between two wires, its values range from 0.1 dB to 0.2 dB per crossing. The bending loss ($L_{bend}$) 302 occurs when a signal is transmitted through a bending wire, and its values range from 0.01 dB to 0.1 dB per bend, which is inversely proportional to the radius of curvature. To reduce excessive optical signal losses, the bending radii of wires need to satisfy the minimum/maximum bending radius constraints, which is specified by the designers. The splitting loss ($L_{split}$)

306 happens when a signal splits into multiple sinks. Its values range from 0.01 dB to 2 dB per split, determined by the efficiency factor of a signal splitter. The path loss ($L_{path}$) 308 is induced when a signal is transmitted through a long wire. It is often neglected. Its values range from 0.01 dB to 2 dB per centimeter, which is proportional to the wirelength. The drop loss ($L_{drop}$) 310, 312 is induced when a signal is switched from one waveguide to another. Its values range from 0.01 dB to 0.5 dB per switch. It is a WDM-induced overhead.

In this invention, the total transmission loss L is the summation of the above transmission loss calculated as follows:

$$L = L_{cross} + L_{bend} + L_{split} + L_{path} + L_{drop}. \quad (1)$$

The WDM overheads include the previously mentioned drop loss and wavelength power. The wavelength power relates to the number of laser sources for providing different wavelengths. Besides drop loss, using WDM waveguides could also incur another power overhead: wavelength power ($H_{laser}$). When multiple signals are clustered into a WDM waveguide, different wavelengths are needed for signal transmission. This requires more laser sources, which implies more power consumption.

(B) Problem Formulation

The problem formulation of a complete WDM-aware routing problem is given signal netlist, pin locations and the maximum capacity for WDM waveguides. Constraint is number of nets in WDM waveguides not exceed the maximum capacity. The target is to generate a routing result minimizing total wirelength, transmission loss, and wavelength power. The WDM-aware optical routing problem addressed in this invention can be formulated as follows:

Problem 1 (WDM-aware Optical Routing): Given a signal netlist, pin locations, and a maximum capacity for a WDM waveguide $C_{max}$, generate a routing result that minimizes total wirelength, transmission loss, and wavelength power, while the number of nets in each WDM waveguide does not exceed $C_{max}$. In this WDM-aware optical routing problem, however, it is too complicated to determine both the clusters of signal nets and the route at the same time, so this problem is divided into two subproblems (clustering and routing).

Problem 2 (WDM-aware Path Clustering): Given a signal netlist, pin locations, and a maximum capacity for a WDM waveguide $C_{max}$, determine the clusters of signal nets and corresponding positions of WDM waveguides to minimize the estimated wirelength, transmission loss, and wavelength power, while the number of nets in each WDM waveguide does not exceed $C_{max}$.

Problem 3 (Pin-to-Waveguide Routing): Given a signal netlist, pin locations, net clusters, and WDM waveguides positions for each net, generate a routing result which minimizes total wirelength and transmission loss.

WDM-Aware Optical Routing Flow

Figure 4:
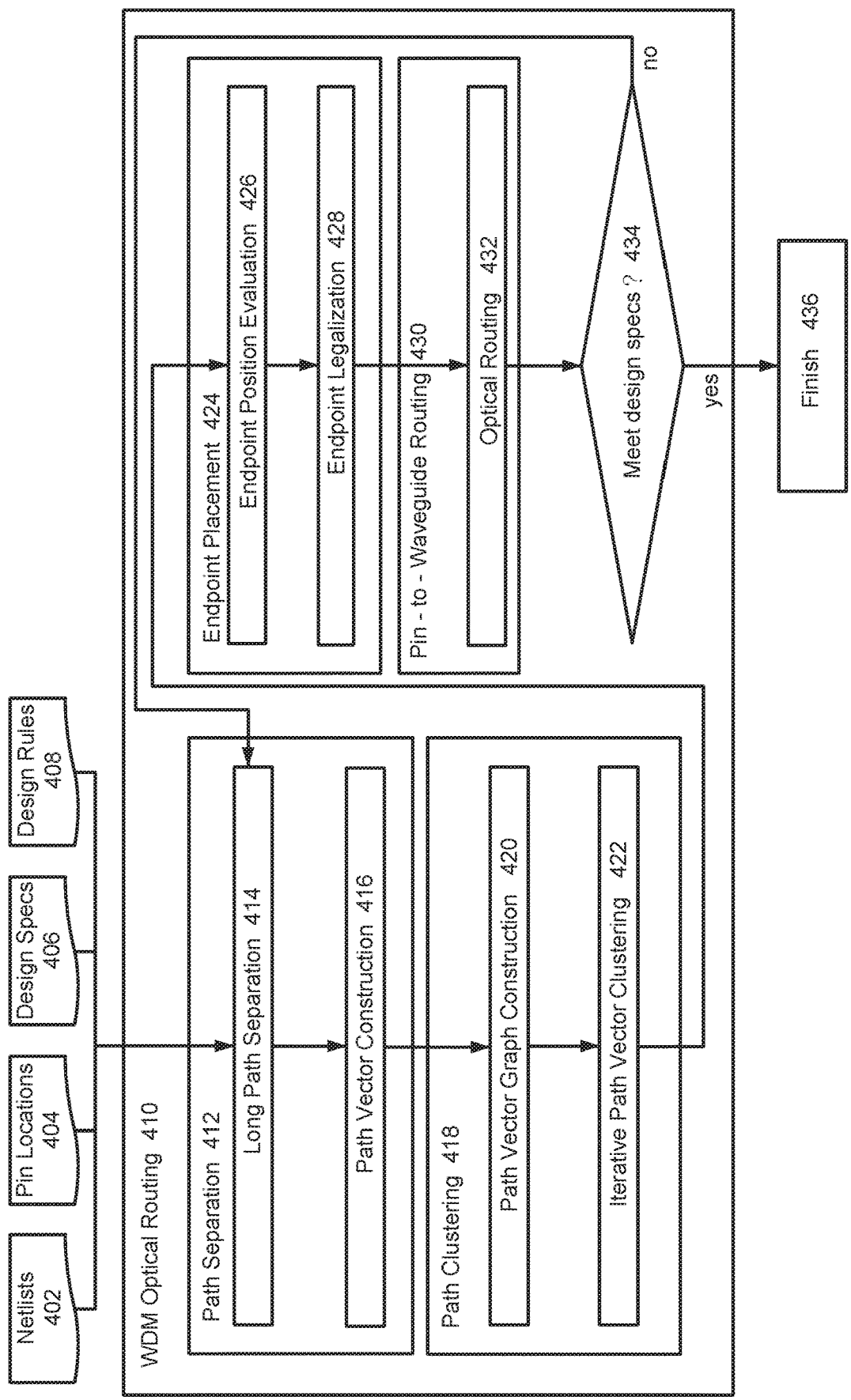
FIG. 4 shows a process flow of WDM-aware optical routing according to the invention.

In this invention, WDM-aware optical routing 410 is disclosed. An overview of the WDM-aware optical routing flow is proposed, and then introducing how the aforementioned two routing subproblems are handled. FIG. 4 shows the process flow of WDM-aware optical routing for on-chip communication module or system which consists of the following four stages: (1) Path Separation 412, (2) Path Clustering 418, (3) Endpoint Placement 424, and (4) Pin-to-Waveguide Routing 430. The on-chip communication module or system is constructed by multiple layers devices or SoC. Path Separation identifies the signal net candidates for using WDM waveguides, Path Clustering finds the clusters of the signal nets based on a provably good approximation algorithm, Endpoint Placement finds the legal locations for WDM endpoints, and Pin-to-Waveguide Routing connects all pins to the corresponding WDM waveguides.

Firstly, netlists 402, pin locations 404, design specs 406 and design rules 408 are input. Then, the WDM-aware optical routing including the following four stages is performed. The netlists 402 include one or more design models. A process technology file can provide pre-assignment netlists, pin locations, design specs and design rules.

Path Separation

To reserve limited WDM bandwidth and prevent overheads from redundant WDM waveguides, pin separation is first performed to identify signal path candidates for clustering.

Since there is a maximum capacity $C_{max}$ for each WDM waveguide, the WDM waveguide bandwidth is limited, and thus should be reserved for suitable signal nets to avoid redundant WDM waveguide generation, which could incur excessive routing resource and power overheads. Therefore, the step of path separation 412 is perform to identify the signal path candidates for clustering. Here a signal path represents a source-to-target path that transmits a signal. The path separation 412 includes two sub-steps: long path separation 414 and path vector construction 416.

Figure 5:
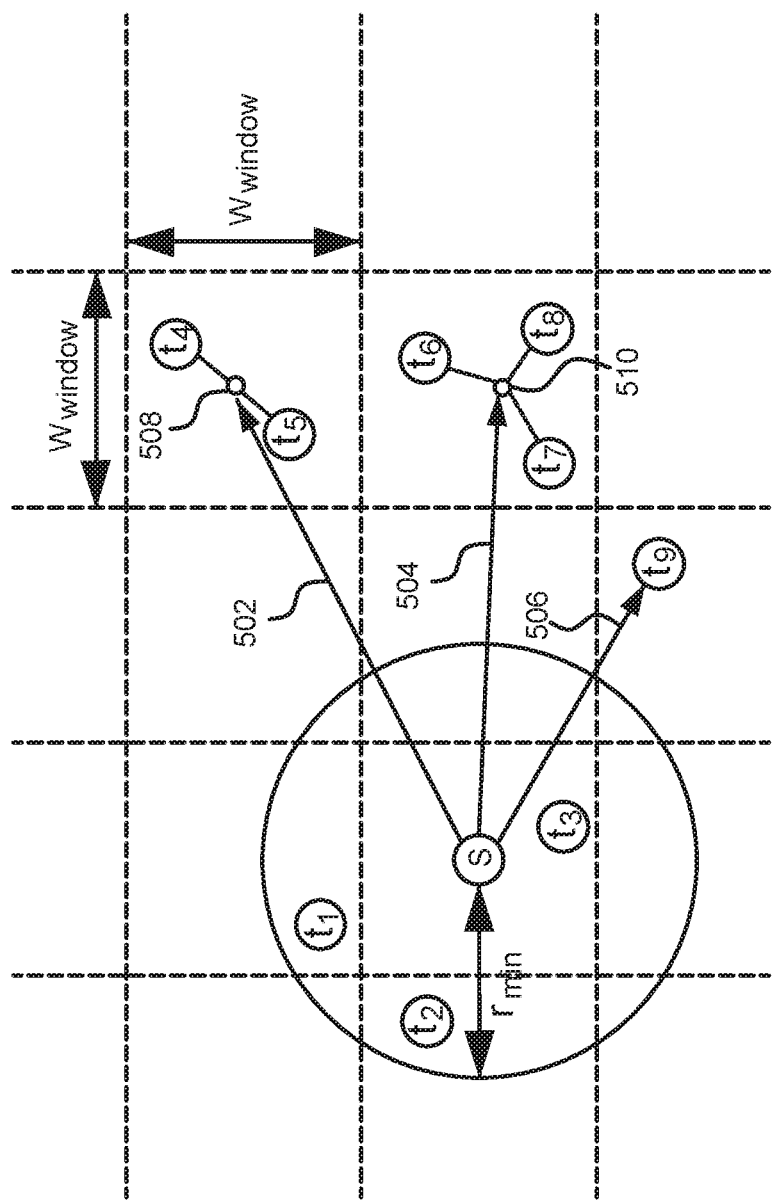
FIG. 5 shows signal paths separated into two sets, one for WDM-aware path clustering and another for direct routing.

For long path separation 414: Given the locations of the source pin and the target pins in a net, all source-to-target Euclidean distances are first calculated, and then select the target pins ($t_4$, $t_5$, $t_6$, $t_7$, $t_8$, $t_9$), with the distances longer than a user-defined threshold distance $r_{min}$ to form the set S, and the target pins ($t_1$, $t_2$, $t_3$), with distances shorter than $r_{min}$ to form the set $S_1$, as shown in FIG. 5. The signal paths from the source to pins in S might incur crosses and/or detours caused by other signal paths, and are thus suitable to use the WDM waveguides. In contrast, the signal paths from the source to pins in $S_1$ are regarded as simple routes, which can be routed directly with short wirelength and without crossing, and are thus prohibited from using the WDM waveguides.

For path vector construction 416: After identifying the long signal paths, path vectors are generated accordingly. A path vector is composed of a starting point and an end point from a candidate's source and target pins, which represents the direction, distance, and spatial location of a signal path. The path vectors 502, 504, 506 are candidates for clustering in the next stage. In order to reduce the number of candidates generated after the path separation, the routing area is split into grid-like windows by a user-defined parameter $W_{window}$. In each window, the target pins that belong to the same net, and the source pin of that net, are grouped to form a path vector. The starting point of a path vector is the location of the source pin, while the end point of a path vector is the centroid of all target pins, as shown in FIG. 5. That is, the end point of the path vector 502 is the centroid 508 of target pins ($t_4$, $t_5$), and the end point of the path vector 504 is the centroid 510 of the target pins ($t_6$, $t_7$, $t_8$). For the target pins $t_9$, the end point of the path vector 506 is the location of the target pins $t_9$.

Path Clustering

After the step of path separation 412, path clustering 418 is performed. Different combinations of signal path grouping significantly affect the final routed wirelength, transmission loss, and wavelength power, as shown previously in FIG. 2. Therefore, determining the groups of signal paths (called path clusters) to share the same WDM waveguides plays a crucial part before the routing stage.

To best use the WDM waveguides, it needs to estimate the total wirelength, transmission loss, and wavelength power induced by the path clusters. Hence a scoring strategy is proposed to evaluate the path clusters as follows:

$$\text{Score}(c_i) = c_i^{sim} - c_i^{pen} \qquad (2)$$

$$= \frac{2 \sum_{\substack{p_a, p_b \in c_i \\ p_a \neq p_b}} p_a \cdot p_b}{\left| \sum_{p_a \in p c_i} p_a \right|} -$$

$$\sum_{\substack{p_a, p_b \in c_i \\ p_a \neq p_b}} d_{ab} - |c_i|(H_{laser} + 2L_{drop})$$

where $c_i$ denotes the path cluster i, $p_a=(s_a, t_a)$ denotes the path vector a starting from $s_a$ and ending at $t_a$, $d_{ab}$ represents the distance between the path vectors a and b, and $|c_i|$ represents the number of nets in $c_i$.

Here the definition of new operators and notations on path vectors are first given. Please refer to the following:

Inner product: The inner product between $p_a$ and $p_b$ represents the inner product formed by two mathematical vectors which start from $s_a$, $s_b$ and end at $t_a$, $t_b$, respectively.

Summation: The summation of path vectors represents the vector sum of all path vectors.

Absolute value (Length): The absolute value of $p_a$ represents the distance between $s_a$ and $t_a$.

Distance: The distance between $p_a$ and $p_b$ is the minimum distance between two line segments formed by $p_a$ and $p_b$.

The score in Equation (2) consists of two terms, $c^{sim}$ and $c^{pen}$. The first term represents the similarity of the path vectors. Since clustering the path vectors with the same direction and longer lengths will significantly reduce the total wirelength and transmission loss, the clustering of these path vectors is regarded as a gain. In the second term, since clustering the path vectors with long distances will increase the total wirelength and transmission loss, the clustering of these path vectors is regarded as a penalty. And the overheads of using the WDM waveguides are also considered as a penalty to avoid redundant WDM waveguide generation.

The objective in this stage is to find the path clusters that minimize the total wirelength, transmission loss and wavelength power after routing, which is equivalent to maximizing the sum of the scores of all path clusters.

Here the proposed provably good WDM-aware path clustering algorithm is explained, as summarized in the following Algorithm 1. Given the path vector set P, Lines 1-5 generate the nodes and edges from the path vectors and construct the path vector graph, which will be detailed in the following (Path Vector Graph Construction). Then Line 12 checks if the two nodes connected by the edge with the largest gain, $e_{max}$, can be clustered. If so, Lines 13-14 then merge the two nodes and update the gain. After that, Line 15 finds the next edge with the largest gain. Lines 9-15 continue until no edges remain or the largest gain is negative. The iterative step will be detailed in the following (Iterative Path Vector Clustering). Then the algorithm by returning V is completed, where each node n in V represents a path cluster of all signal paths in it.

---

Algorithm 1 Path Clustering

---

Require: P
Ensure: The optimal clustering for all paths
 1: for all path vector $p_i$ in P do
 2:  generate a node $n_i$ in V
 3: for all $(n_i, n_j)$, $i \neq j$ do
 4:  generate an edge $e_{ij}$ in E
 5: G = (V, E) is the path vector graph
 6: if E = 0 then
 7:  return V
 8: $e_{max}$ is the first edge with maximum gain $g_{max}$ in E
 9: while E ≠ 0 do
10:  if $g_{max}$ < 0 then
11:   break
12:  if isClusterable($e_{max}$) then
13:   merge(G, $e_{max}$)
14:   updateGain(G, $e_{max}$)
15:  $e_{max}$ findMax(G)
16: return V

---

The path clustering 418 includes path vector graph construction 420 and iterative path vector clustering 422 which describe as the following.

Figure 6:
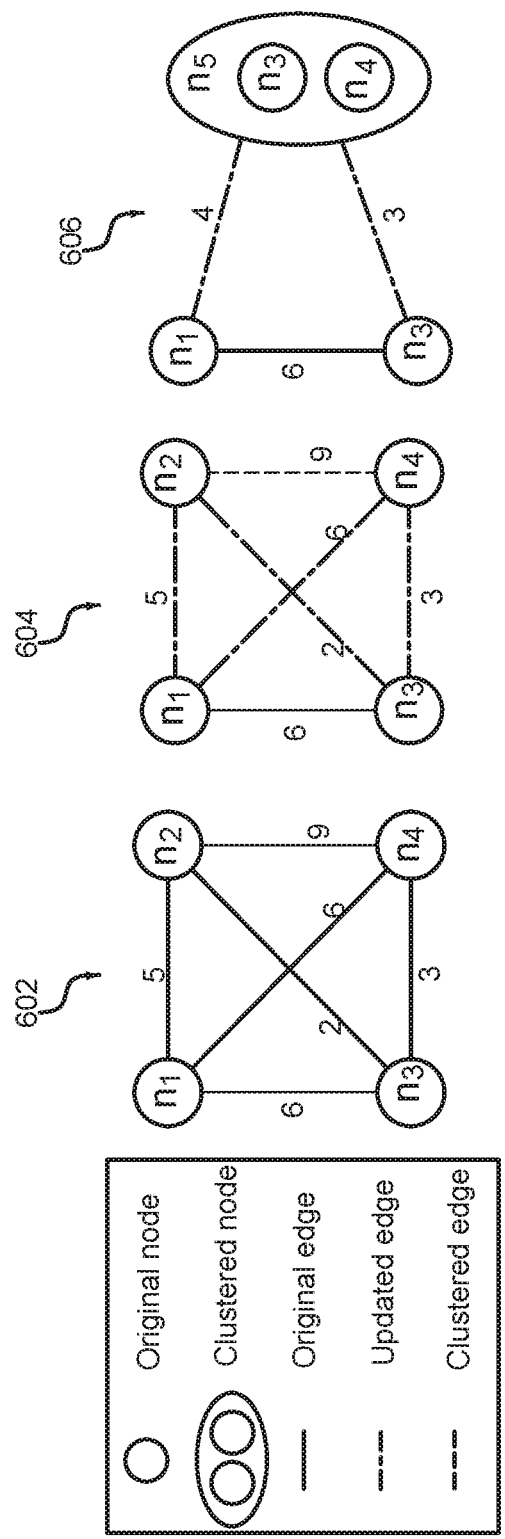
FIG. 6 illustrates path clustering.

Path Vector Graph Construction:

A path vector graph is a graph defined as G=(V, E). Here V is the set of nodes, where each node includes path vectors that form a path cluster. And E includes weighted edges that indicate the gains of the objective function after merging the path clusters connected by the edges. For example, the path vector graph is indicated by the reference number 602 in FIG. 6. The edge exists when there is at least a pair of signal paths from both clusters with a non-zero overlap segment. Here the overlap segment represents the overlap of two line segments, which are the projections of two path vectors onto their angle bisector. This is to ensure that these path clusters can share an effective WDM waveguide. The weight of an edge $e=(n_1, n_2)$, where $n_i$ is the path cluster node i in V, is defined as follows:

$$g_{ij} = \text{Score}(n_i, n_j) - \text{Score}(n_i) - \text{Score}(n_j) \qquad (3)$$

$$= \frac{c_i^{sim} \cdot \left| \sum_{a \in n_i} p_a \right|}{\left| \sum_{a \in n_i} p_a + \sum_{a \in n_j} p_b \right|} \frac{c_j^{sim} \cdot \left| \sum_{b \in n_j} p_b \right|}{\left| \sum_{b \in n_i} p_a \cdot \sum_{b \in n_j} p_b \right|} +$$

$$\frac{\left| \sum_{a \in n_i} p_a \right| \cdot \left| \sum_{a \in n_j} p_b \right|}{\left| \sum_{a \in n_i} p_a + \sum_{a \in n_j} p_b \right|} - c_j^{pen} - c_j^{pen}.$$

where $g_{ij}$ is the gain of the objective function, Score ($n_i$) represents the score of the path cluster in $n_i$, and Score ($n_i$, $n_j$) represents the score of the path cluster of $n_i$ and $n_j$. For easier presentation, the overloaded notation Score is used for the score with 1- or 2-node clustering here.

In the initial path vector graph construction, each single path vector forms a unique node. In each node $n_i$, $c_i^{sim}$, $c_i^{pen}$, and $\Sigma_{a \in n_i} p_a$ are recorded. Then, $c_i^{sim}$ is set to zero, and is calculated. After that, the gain of each pair of nodes is computed to form the edges. Finally, the edges are sorted in the non-increasing order to record the edge with the largest gain.

Iterative Path Vector Clustering:

After the path vector graph construction, a provably good path clustering algorithm is proposed to find optimal path clusters that maximize the total score. In each iteration, the edge with the largest gain is chosen that satisfies the maximum capacity $C_{max}$ of a WDM waveguide for the number of nets in the adjacent nodes of this edge, or the algorithm terminates if merging any two path clusters will violate the WDM waveguide capacity constraint. After finding the edge, the nodes connected by the edge is merged, as indicated by the reference number 604 in FIG. 6. The merging of nodes represents the clustering of all path vectors in these nodes.

After the nodes are merged, the edge connecting these nodes is removed, and then the edges connecting the newly merged node ($n_5$) are created. The gains of edges adjacent to the merged node are calculated by Equation (3). The graph after merging is still a path vector graph, and the nodes in each cluster form a clique in the original path vector graph, as indicated by the reference number 606 in FIG. 6. This iteration is continued until no edges can be merged or the largest gain is negative, which means that the total wirelength and transmission loss can no longer be improved after clustering.

The proposed algorithm can achieve an optimal path clustering for 1-, 2-, and 3-path clustering, and has the constant performance bound 3 for most cases of 4-path clustering as follows:

Theorem 1: The path vector clustering algorithm guarantees to find an optimal solution when $|V|\leq 3$, where $|V|$ is the size of the node set in the path vector graph. Proof 1: For $|V|=1$, there are no edges, so no path clustering is needed in the optimal solution. For $|V|=2$, there is only one edge. If the gain of this edge is positive, this edge will be clustered in the optimal solution. Otherwise, no further path clusterings are needed in the optimal solution. Since the proposed algorithm clusters the edge $e_{max}$ if $g_{max}>0$ and terminates if $g_{max}<0$, the result must be the same as the optimal solution. For $|V|=3$, there are three cases of optimal solutions: (a) no nodes are clustered, (b) two nodes are clustered, or (c) all nodes are clustered. Case (a) implies that $g_{max}<0$. Since the proposed algorithm terminates if $g_{max}<0$, the result remains the same as this solution. Case (b) implies that $g_{max}$ is positive, and is the score of this solution. Since the proposed algorithm always clusters $e_{max}$ if $g_{max}>0$, the result will be the same as this solution. In Case (c), according to Equation (2), the optimal score is positive, implying that there exist two path vectors $p_a$ and $p_b$ such that the inner product of $p_a \cdot p_b > 0$, and thus at least one edge gain is positive. Furthermore, since three nodes are clustered in this optimal solution, the gain of the remaining edge after the first path clustering is still positive. Since the proposed algorithm always clusters $e_{max}$ if $g_{max}>0$, the result remains the same as this solution. Therefore, the proposed algorithm guarantees to find an optimal solution when $|V|\leq 3$.

Figure 7:
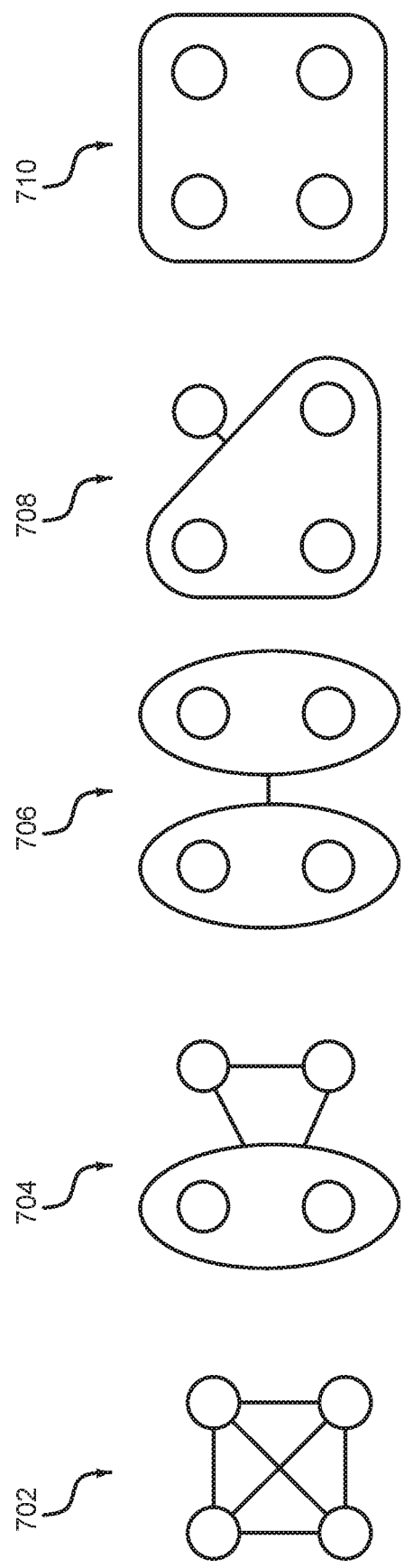
FIG. 7 shows five cases of optimal solutions in 4-path clustering.

Theorem 2: The path vector clustering algorithm has the performance bound 3 when $|V|=4$ and $$\cos\theta > \frac{-|p_k|}{2|p_i+p_j|},$$

where $p_i$, $p_j$, $p_k$ are the path vectors in nodes $n_i$, $n_j$, $n_k$ in V, respectively, and θ is the angle between $p_i+p_j$ and $p_k$. Proof 2: For $|V|=4$, since the nodes in each cluster form a clique in the original path vector graph, there are five cases of optimal solutions in 4-path clustering: (a) no nodes are clustered (indicated by the reference number 702), (b) two nodes are clustered (indicated by the reference number 704), (c) two node pairs with no common edges are clustered (indicated by the reference number 706), (d) three nodes are clustered (indicated by the reference number 708), and (e) all nodes are clustered (indicated by the reference number 710), as shown in FIG. 7. In Cases (a), (b), and (e), the proposed algorithm can generate an optimal solution, and the proofs are similar to the case when $|V|=3$ (see Proof 1). In Case (c), let $e_1$ and $e_2$ be the two edges in an optimal solution. Since $0\leq g_1$, $g_2 \leq g_{max}$, which implies that $g_1+g_2 \leq 2 \cdot g_{max}$, the constant performance bound 2 is obtained. In Case (d), if the angle condition holds, then $$|p_i+p_3+p_k|<|p_i+p_j|, \qquad (4)$$

implying that $$g_{ijk} = \frac{2\sum_{\substack{a,b\in\{i,j,k\}\\a\neq b}} p_a \cdot p_b}{|p_i+p_j+p_k|} - \sum_{\substack{a,b\in\{i,j,k\}\\a\neq b}} d_{ab} + h_{ab} < \qquad (5)$$

$$\sum_{\substack{a,b\in\{i,j,k\}\\a\neq b}} \frac{2p_a \cdot p_b}{|p_a \cdot p_b|} - (d_{ab}+h_{ab})$$

$$= g_{ij}+g_{ik}+g_{jk} \leq 3 \cdot g_{max},$$

which holds for any i, j, and k. Therefore, the constant performance bound 3 is obtained. Overall, the proposed algorithm has the constant performance bound 3 for most cases of $|V|=4$.

Endpoint Placement

After the step of the path clustering 418, endpoint placement 424 is performed. The clusters of signal paths for the WDM waveguides are determined. The drop loss and wavelength power are thus determined. In this stage, based on the path clustering result, the endpoints of the WDM waveguides are placed to minimize the estimated routing cost. The endpoint placement 424 includes endpoint position evaluation 426 and endpoint legalization 428 which describe as the following.

End Point Evaluation:

In the step of the endpoint position evaluation 426, to place the endpoints of the WDM waveguides to minimize the total wirelength and transmission loss, a hybrid cost function is used to guide the gradient-search method to find optimal endpoint positions as follows:

$$\text{cost}=\alpha*W+\beta*\Sigma l+\gamma*l_{max}, \qquad (6)$$

where W is the estimated wirelength, l is the estimated signal path length, $l_{max}$ is the longest estimated signal path length, and α, β, γ are user-defined coefficients. Through the gradient-search method, optimal endpoint positions can be found to minimize the cost function.

End Point Legalization:

In this stage of the endpoint legalization 428, since the positions of the endpoints from the previous stage may be illegal when overlapping with obstacles, pins, or routed wires, the actual positions of the endpoints of the WDM waveguides are determined based on the best positions. The endpoints to the nearest legal positions are moved to minimize the displacement, so that the degradation of the result after legalization is minimized.

Pin-to-Waveguide Routing

After the step of the endpoint placement 424, pin-to-waveguide routing 430 is performed. In this stage, optical routing 432 for example A* search routing is performed to minimize the total wirelength and transmission loss. All nets are routed by A* search to minimize the total wirelength and transmission loss. A* is an informed search algorithm, or a best-first search, meaning that it is formulated in terms of weighted graphs: starting from a specific starting node of a graph, it aims to find a path to the given goal node having the smallest cost (least distance travelled, shortest time, etc.). Next, in step 434, it checks whether the results of the optical routing meet design specs or not. The sizes of routing grids are first set to meet the minimum/maximum bending radius constraints. Then, each WDM waveguide is routed from one endpoint to the other. The WDM waveguides are first routed and then the normal waveguides are routed. Finally, the signal paths are routed from the source pins to the directly routed pins, from the source pins to the WDM waveguides, and from the WDM waveguides to the target pins. Accordingly, as the results of the optical routing meet design specs, the final step 436 of WDM-aware optical routing is finished.

For the minimum/maximum bending radius constraints, the method in the invention is performed to adjust the routing grid size such that both minimum and maximum radii constraints are satisfied. The path searching directions require larger than 60 degree to avoid any sharp bending. That is, during routing, the routing grid sizes are adjusted to satisfy the radius constraints, and require path search directions to be larger than 60 degree to prevent large bending loss.

To guide the routing algorithm to find a better route, the following equation is used to predict the routing cost:

$$\alpha*W + \beta*L, \quad (7)$$

As mentioned above, where W is the estimated wirelength, L is the total transmission loss, and $\alpha$, $\beta$ are coefficients in Equation (6). For transmission loss estimation, bending loss, splitting loss, and path loss are straightforward to be estimated by examining the current routed path. For crossing loss estimation during A* search routing, if the current routing path propagates across a routed signal, a unit of crossing loss will be added to its estimated transmission loss.

In the present invention, the proposed WDM-aware path clustering algorithm and the WDM aware optical routing flow may be implemented in the C++ programming language. All experiments were performed on an Intel Xeon 2.1 GHz Linux workstation with 16 GB memory. The experiments are performed based on the seven ISPD 2007 contest benchmarks, the ten ISPD 2019 contest benchmarks, and a real optical design from the authors of the work (A. Boos, L. Ramini, U. Schlichtmann and D. Bertozzi, "PROTON: an automatic place-and-route tool for optical networks-on-chip," in *Proc. Of ICCAD*, 2013). For the ISPD benchmarks, the preprocessed setting is the same as those in the previous work (D. Ding, B. Yu and D. Z. Pan, "GLOW: a global router for low-power thermal-reliable interconnect synthesis using photonic wavelength multiplexing," in *Proc. of ASP-DAC*, 2012). In these benchmarks, the WDM waveguide capacity is set to 32, and the transmission loss for crossing, bending, splitting, path loss, drop loss, and wavelength power to 0.15 dB per cross, 0.01 dB per bend, 0.01 dB per split, 0.01 dB per centimeter, 0.5 dB per drop, and 1 dB, respectively.

To show the completeness, effectiveness, and efficiency of the proposed optical routing flow and the path clustering algorithm, two experiments are performed. First, the results of the path clustering algorithm and the optical routing flow of the invention are evaluated, the engines of the state-of-the-art works GLOW (mentioned above) and OPERON (D. Liu, Z. Zhao, Z. Wang, Z. Ying, R. T. Chen and D. Z. Pan, "OPERON: optical-electrical power-efficient route synthesis for on-chip signals," in *Proc. of DAC*, 2018) are implemented, and compared with them. Then, the proposed algorithm without using any WDM waveguides is compared to examine the quality of the invention's path clustering algorithm. The wirelength computation consists of the length of both WDM waveguides and normal optical waveguides, and the transmission loss is calculated by Equation (1).

Table I summarizes the experimental results of the ISPD 2019 contest benchmarks and the real design. Due to the space limitation, it will only summarize the results of the ISPD 2007 ones, without showing the details. In the first experiment, GLOW with the Gurobi ILP solver ("Gurobi optimizer reference manual," *Gurobi Optimization, Inc.*, 2018. http://www.gurobi.com) are implemented. The path clustering method OPERON handled the electrical-optical co-design first and then clustered optical nets. For fair comparison, all the nets are made in the benchmarks optical ones. Their detailed routing was performed by the routing scheme presented in the stage of the Pin-to-Waveguide Routing. As shown in Table I, for the ISPD 2019 contest benchmarks and the real design, the proposed path clustering algorithm achieved a 60% wirelength reduction, a 45% transmission loss reduction, an 86% number of wavelengths reduction, and a 1.9× speedup compared with GLOW, and a 64% wirelength reduction, a 46% transmission loss reduction, an 84% number of wavelengths reduction, and a 5.7× speedup compared with OPERON. For the ISPD 2007 contest benchmarks, the proposed algorithm achieved a 66% wirelength reduction, a 51% transmission loss reduction, an 87% number of wavelengths reduction, and a 1.8× speedup compared to GLOW, and a 74% wirelength reduction, a 53% transmission loss reduction, an 86% number of wavelengths reduction, and a 6.1× speedup compared to OPERON.

TABLE I

| | GLOW | | | | OPERON | | | | Ours w/WDM | | | | Ours w/o WDM | | |
| --- | --- | --- | --- | --- | --- | --- | --- | --- | --- | --- | --- | --- | --- | --- | --- |
| | WL | TL | NW | Time | WL | TL | NW | Time | WL | TL | NW | Time | WL | TL | Time |
| ispd_19_1 | 47070 | 53.78 | 18 | 1.41 | 22587 | 48.44 | 32 | 7.44 | 4098 | 14.55 | 3 | 0.54 | 4181 | 14.75 | 0.55 |
| ispd_19_2 | 23405 | 69.97 | 13 | 8.05 | 29622 | 47.49 | 32 | 5.18 | 9988 | 22.92 | 5 | 0.81 | 11028 | 23.66 | 0.83 |
| ispd_19_3 | 20506 | 72.66 | 32 | 4.6 | 22375 | 49.40 | 32 | 5.02 | 7500 | 21.13 | 2 | 0.84 | 7596 | 21.16 | 0.75 |
| ispd_19_4 | 23612 | 75.71 | 32 | 3.42 | 25308 | 55.56 | 32 | 6.83 | 8609 | 24.86 | 2 | 0.81 | 9012 | 25.37 | 0.78 |
| ispd_19_5 | 29211 | 61.05 | 21 | 13.02 | 32943 | 50.29 | 32 | 13.68 | 17027 | 30.34 | 4 | 1.4 | 17745 | 30.82 | 1.86 |
| ispd_19_6 | 40777 | 70.44 | 23 | 32 | 36685 | 41.66 | 32 | 17.89 | 16785 | 22.68 | 5 | 1.58 | 20009 | 22.72 | 1.67 |
| ispd_19_7 | 39823 | 62.82 | 32 | 27.98 | 38361 | 39.78 | 32 | 39.73 | 16979 | 22.61 | 5 | 1.75 | 19294 | 23.00 | 2.93 |
| ispd_19_8 | 45850 | 72.33 | 32 | 31.93 | 43938 | 34.42 | 32 | 13.17 | 15043 | 15.78 | 4 | 6.94 | 16933 | 16.13 | 1.34 |
| ispd_19_9 | 404447 | 38.81 | 32 | 104.21 | 48746 | 31.24 | 32 | 8.72 | 19625 | 16.64 | 4 | 1.41 | 22186 | 16.64 | 1.7 |
| ispd_19_10 | 112229 | 81.55 | 32 | 295.8 | 63762 | 28.89 | 32 | 30.15 | 29318 | 17.64 | 6 | 4.64 | 34933 | 18.08 | 3.64 |

TABLE I-continued

| | GLOW | | | | OPERON | | | | Ours w/WDM | | | | Ours w/o WDM | | |
|---|---|---|---|---|---|---|---|---|---|---|---|---|---|---|---|
| | WL | TL | NW | Time | WL | TL | NW | Time | WL | TL | NW | Time | WL | TL | Time |
| 8°8 | 11951 | 27.36 | 8 | 23.68 | 8868 | 26.7 | 8 | 26.52 | 9575 | 25.61 | 5 | 9.21 | 11091 | 28.62 | 6.96 |
| Comparison | 2.60 | 2.92 | 6.31 | 22.82 | 2.41 | 1.93 | 7.29 | 7.28 | 1 | 1 | 1 | 1 | 1.13 | 1.03 | 0.96 |

In the second experiment, for the ISPD 2019 contest benchmarks and the real design, the proposed path clustering algorithm reduced 16% wirelength and 5% transmission loss in these benchmarks with a 1.9× speedup, compared with the routing without using any WDM waveguide. For the ISPD 2007 ones, the proposed algorithm reduced 14% wirelength and 4% transmission loss in these benchmarks with a 2× speedup, over the routing without using any WDM waveguide.

The reasons why the proposed algorithm can achieve significant reductions in wirelength, transmission loss, and number of wavelengths with a signification speedup are analyzed as follows:

(1) The proposed algorithm does not assign redundant WDM waveguides, which could substantially reduce the number of crosses and thus the transmission loss. In contrast, the WDM waveguides in GLOW and OPERON could redundantly be placed across the routing regions. As a result, the utilization rate of WDM waveguides is small, and thus excessive crosses between WDM waveguides might occur, which would incur large wirelength and transmission loss.

(2) The invention prevents signal paths of different directions from sharing a WDM waveguide, which could avoid wire detouring. In contrast, the flows in GLOW and OPERON do not consider this issue.

(3) The invention considers the total wirelength, the total path length, the maximum path length, and transmission loss minimization during WDM endpoint placement for routing cost minimization. In contrast, the flows in GLOW and OPERON also do not consider this issue.

(4) During path clustering, the invention considers the WDM overheads, including drop loss and wavelength power. Such consideration helps us prevent excessive laser power consumption for WDM usage. In contrast, the flows in GLOW and OPERON try to maximize the utilization rate of each WDM waveguides, and thus increase the number of wavelengths.

(5) The proposed algorithm can generate a provably good path clustering result with a constant performance bound for most cases. To show the effectiveness, the percentages of 1-, 2-, 3-, and 4-path clusterings in all paths are calculated, which can be clustered optimally or with a constant performance bound by the proposed WDM-aware path clustering algorithm. As shown in Table II, the 1-, 2-, 3-, and 4-path clusterings are the majority (84.51%) in the optical interconnections. Therefore, the proposed performance bound can be applied to most cases.

TABLE II

| Circuits | # Nets. | # Pins | % 1-, 2-, 3-, and 4-path clusterings |
|---|---|---|---|
| ispd_19_1 | 69 | 202 | 78.02 |
| ispd_19_2 | 102 | 322 | 89.55 |
| ispd_19_3 | 100 | 259 | 66.44 |
| ispd_19_4 | 78 | 230 | 89.66 |
| ispd_19_5 | 136 | 381 | 89.82 |
| ispd_19_6 | 176 | 565 | 91.24 |
| ispd_19_7 | 179 | 590 | 89.49 |
| ispd_19_8 | 230 | 735 | 96.10 |
| ispd_19_9 | 344 | 1056 | 91.41 |
| ispd_19_10 | 483 | 1519 | 90.70 |
| 8x8 | 8 | 64 | 57.14 |
| Average | — | — | 84.51 |

(6) The invention divides the WDM-aware optical routing problem into two subproblems, and handles them in two separate stages, which decreases the problem size and the distances between the routing sources and the targets. Furthermore, the invention adopts an approximation algorithm, instead of a time-consuming ILP solver, to solve the WDM path clustering problem. As aforementioned, the invention considers several WDM-aware features to improve the WDM clustering quality. Therefore, the invention could significantly reduce the runtime and transmission loss even with the separate stages. In contrast, both GLOW and OPERON handle the WDM-aware optical routing problem as a whole by ILP formulations, and their considered WDM-aware features are incomplete, which substantially increases the runtimes and reduces the solution quality.

The proposed scheme can also work well for short-distance communication and crowded networks theoretically and empirically. Theoretically, the proposed scheme includes a scoring function which normalizes the distance impact, as shown in Equation (2). Therefore, the distance of communication would not affect the quality. Moreover, since the WDM technique is supposed to handle crowded networks by reducing routed area and wirelength, the proposed scheme works relatively even better for crowded networks. Empirically, the proposed benchmarks contain both short- and long-distance communications, and each benchmark contains crowded networks. The experimental results show that our proposed scheme can handle these benchmarks with various configurations well.

The main contributions, advantages and features of this invention are summarized as follows:

(a) The invention proposes a provably good approximation algorithm for WDM-aware path clustering to minimize the wirelength, transmission loss, and wavelength power. The WDM-aware clustering algorithm is exact for 1-, 2-, and 3-path clustering and has the constant performance bound 3 for most cases of 4-path clustering. To our best knowledge, this is the first polynomial-time algorithm that can guarantee a performance bound for WDM-aware clustering.

(b) The invention formulates the WDM-aware optical routing problem and divide it into two subproblems, called the WDM-aware path clustering subproblem and the pin-to-waveguide routing subproblem. Then, a complete WDM-aware optical routing flow is proposed which combines a WDM-aware path clustering scheme and a pin-to-waveguide routing one to minimize wirelength, transmission loss, and wavelength power.

(c) An accurate wirelength, transmission loss, and wavelength power estimation method is proposed. The prediction and evaluation of optical routing results are substantially improved.

(d) Experimental results based on the ISPD 2007 and 2019 contest benchmarks and a real design show that the proposed optical router significantly outperforms published works in wirelength, transmission loss, wavelength power, and runtimes.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A non-transitory computer-readable medium containing instructions, which when read and executed by a computer, cause the computer to execute a WDM-aware optical routing method for on-chip devices, wherein the WDM-aware optical routing method comprises steps of:
performing a path separation to identify at least one signal net candidates, wherein said signal net is at least one signal path between a source pin and a target pin;
performing a path clustering to find path clusters of said signal net candidates, wherein said at least one signal net candidate is at least one said signal net that are considered during said path clustering;
performing an endpoint placement to find legal locations for WDM endpoints; and
performing a pin-to-waveguide routing all nets to corresponding WDM waveguides, wherein said all nets are all signal paths between all of said source pins and said target pins.

2. The non-transitory computer-readable medium of claim 1, further comprising selecting target pins with source-to-target distances longer than a threshold distance as said signal net candidates.

3. The non-transitory computer-readable medium of claim 2, further comprising generating path vectors, each of said path vectors composed of a starting point and an end point from a candidate's source and said target pins.

4. The non-transitory computer-readable medium of claim 1, further comprising constructing a path vector graph including a set of nodes, wherein each node of said set of nodes includes path vectors that form a path cluster.

5. The non-transitory computer-readable medium of claim 1, further comprising a path vector clustering by choosing an edge with a largest gain that satisfies a capacity constraint after merging adjacent nodes connected by said edge, and removing said edge to create new edges for newly merged nodes.

6. The non-transitory computer-readable medium of claim 1, further comprising using results of said path clustering to determine endpoints of WDM waveguides by a gradient-search method.

7. The non-transitory computer-readable medium of claim 6, further comprising a process of legalizing said results of said path clustering by moving said endpoints to nearest legal positions.

8. The non-transitory computer-readable medium of claim 1, further comprising routing said all nets by A* search to minimize a total wirelength and transmission loss.

9. The non-transitory computer-readable medium of claim 1, further comprising adjusting routing grid sizes to satisfy minimum and maximum bending radius constraints and path search directions larger than 60 degree to prevent large bending loss during said pin-to-waveguide routing.

10. The non-transitory computer-readable medium of claim 9, wherein signal paths are routed from source pins to routed pins, from said source pins to said WDM waveguides, and from said WDM waveguides to target pins during said pin-to-waveguide routing.

11. A method of WDM-aware optical routing for on-chip devices which is executed by a computer, the method comprising:
using the computer to perform the following:
performing a path separation to identify at least one signal net candidates, wherein said signal net is at least one signal path between a source pin and a target pin;
performing a path clustering to find path clusters of said signal net candidates, wherein said at least one signal net candidate is at least one said signal net that are considered during said path clustering;
performing an endpoint placement to find legal locations for WDM endpoints; and
performing a pin-to-waveguide routing all nets to corresponding WDM waveguides, wherein said all nets are all signal paths between all of said source pins and said target pins.

12. The method of claim 11, further comprising selecting target pins with source-to-target distances longer than a threshold distance as said signal net candidates.

13. The method of claim 12, further comprising generating path vectors, each of said path vectors composed of a starting point and an end point from a candidate's source and said target pins.

14. The method of claim 11, further comprising constructing a path vector graph including a set of nodes, where each node of said set of nodes includes path vectors that form a path cluster.

15. The method of claim 11, further comprising a path vector clustering by choosing an edge with a largest gain that satisfies a capacity constraint after merging adjacent nodes connected by said edge, and removing said edge to create new edges for newly merged nodes.

16. The method of claim 11, further comprising using results of said path clustering to determine endpoints of WDM waveguides by a gradient-search method.

17. The method of claim 16, further comprising a process of legalizing said results of said path clustering by moving said endpoints to nearest legal positions.

18. The method of claim 11, further comprising routing said all nets by A* search to minimize a total wirelength and transmission loss.

19. The method of claim 11, further comprising adjusting routing grid sizes to satisfy minimum and maximum bending radius constraints and path search directions larger than 60 degree to prevent large bending loss during said pin-to-waveguide routing.

20. The method of claim 19, wherein signal paths are routed from source pins to routed pins, from said source pins to said WDM waveguides, and from said WDM waveguides to target pins during said pin-to-waveguide routing.

* * * * *